UNITED STATES PATENT OFFICE 2,669,175

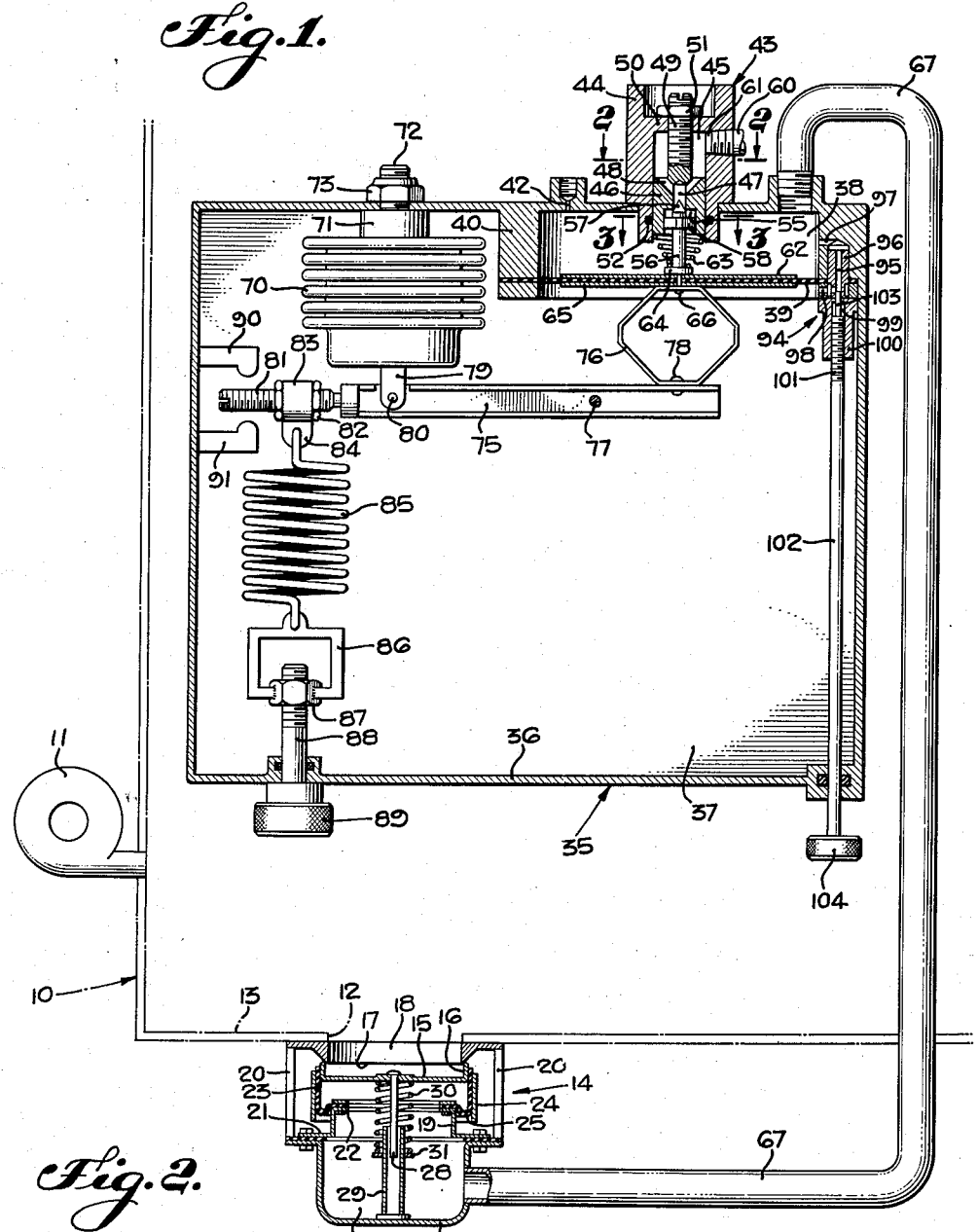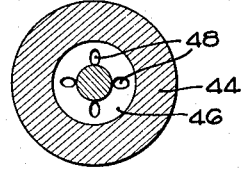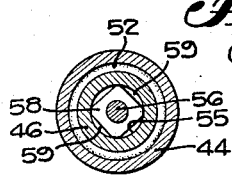

CABIN PRESSURE CONTROL

Richard A. Fischer, Los Angeles, Calif., assignor to The Garrett Corporation, Los Angeles, Calif., a corporation of California Application May 23, 1950, Serial No. 163,769

26 Claims. (Cl. 98—1.5)

This invention relates generally to pressure control mechanisms, and relates more particularly to mechanisms of this character for controlling the rate of pressure change in enclosures.

While the invention has particular utility in connection with pressurized ventilation of aircraft cabins and the like, and is hereinafter shown and described as embodied in such a conditioning system, it is to be understood that its utility is not limited thereto.

It is sometimes highly desirable to produce a gradual change in the air pressure within an aircraft cabin during the flight from one altitude to another, as from a lower altitude airport to a higher one, or vice versa, and it is therefore an object of the present invention to provide means by which the air pressure within a cabin or enclosure may be automatically changed at a predetermined rate. Thus, discomfort or harm to the occupants of the aircraft is avoided.

It is another object of the invention to provide mechanism of this character which is pneumatic in operation.

It is a further object of the invention to provide mechanism of this character, by which the pressure altitude within the cabin may be automatically and smoothly changed at a selectably predetermined rate.

It is another object of the present invention to provide means of this character whereby the pressure within an aircraft cabin may be changed at a gradual preselected rate during flight so that it will have reached a value substantially that of the ambient atmospheric pressure at the terminal airport. Thus, upon landing at an airport situated at a higher or lower altitude than at the starting point of the flight, the occupant or occupants of the craft will find the atmospheric pressure at the terminal airport substantially the same as that within the aircraft when it lands at said terminal airport, thus avoiding any sudden and uncomfortable pressure change at said airport when landing and leaving the aircraft.

It is a further object to control the pressure in pressurized cabins in such manner as will permit the selection of a desired pressure within the cabin and also a desired rate of pressure change within the cabin whereby changes in pressure to which occupants of the cabin are subjected will not be so abrupt or rapid as to cause discomfort.

Let it be supposed that an aircraft upon leaving an airport at one altitude is to land at a field of different altitude within a given period of time. The occupants of the cabin are subjected to a pressure change, produced gradually, so that when the second landing field is reached, the pressure to which the occupants are subjected within the aircraft cabin will correspond to the atmospheric pressure at the second landing field. During the flight from the first field to the second field, although the aircraft may rise to an altitude considerably above the altitude of either landing field, the occupants of the pressurized cabin will not be conscious of this fact, but will be subjected to a reduced pressure no greater than that corresponding to the altitude of the highest of the two landing fields.

Another object of the invention is to provide mechanism of this character which will limit the rate of change in the cabin pressure.

Still another object of the invention is to provide a device of this character that is relatively simple in construction and reliable in operation.

Other objects and advantages of the invention will appear from the following part of the specification.

Referring to the drawing, which is for illustrative purposes only,

Fig. 1 is a diagrammatic or schematic view of pressure control mechanism embodying the present invention;

Fig. 2 is a sectional view taken on line 2—2 of Fig. 1; and

Fig. 3 is a sectional view taken on line 3—3 of Fig. 1.

Referring more particularly to the drawing, there is shown an enclosure or cabin which is indicated generally at 10, supplied by air under pressure by a suitable pump or supercharger 11 operated by any suitable source of power, not shown, for maintaining a flow of air through the cabin, for purposes of ventilation. The cabin is provided with an outlet opening 12, in a wall 13 thereof, said outlet being controlled by an outflow valve, indicated generally at 14 in Fig. 1. The outflow valve 14, as herein shown, constitutes a means for regulating the pressure in the cabin to a value which corresponds to the pressure selected by the control point setting mechanism which will be hereinafter described. Other types of outflow valves may be used, another example being that disclosed in the patent to Kemper No. 2,463,491.

The valve 14 will be but briefly described herein, inasmuch as a valve of this type is fully shown and described in the copending application of Arthur et al., No. 776,842, filed September 29, 1947, now Patent No. 2,531,100.

This valve comprises an outwardly opening balanced valve member 15 in the general shape of a shallow cup, said valve member having a peripheral flange 16 having a thin or narrow edge engageable with a seat 17 attached to the cabin wall and having an opening 18 which registers with the opening 12. An annular member 19, generally Z-shaped in cross section, is supported in spaced relation to the valve seat by means of spacers 20 through which bolts, not shown, pass.

The member 19 includes an outwardly extending annular flange 21 secured by the above referred-to bolts. The Z-shaped member 19 also includes an annular inturned flange 22 to which one end of a flexible diaphragm 23 is secured. The other end of the diaphragm is connected to the valve member 15 by means of an annular collar 24. The diaphragm includes a generally U-shaped portion 25 in the space between the member 19 and the collar 24, said U-shaped portion 25 rolling as the valve member 15 moves axially. A generally cup-shaped cover 26 is attached to the flange 21 and defines, with the member 19, diaphragm 23 and valve member 15, a pressure chamber 27.

The valve 15 is adapted for axial movement and is provided with a stem 28 suitably mounted in a guide 29. A light spring 30, which reacts between the valve member 15 and a collar 31 on the guide 29, urges the valve member 15 in the closing direction.

Mechanism for setting the pressure in the chamber 27 is indicated generally at 35 and comprises a housing 36. The mechanism 35 includes a pressure chamber 37 and a pressure chamber 38, the chamber 37 being defined by a portion of the housing 36 and a flexible diaphragm 39 which separates said chambers 37 and 38. The chamber 38 is defined by said diaphragm 39, and an annular wall 40, as well as by a portion of the housing 36.

The diaphragm 39 is a differential pressure responsive movable wall or element and is part of the pressure differential regulating mechanism for controlling the difference in pressure between the chambers 37 and 38.

Air is bled into the chamber 38 from a source of higher pressure, which is shown as the cabin interior, but may be any source of higher pressure air, through a restricted calibrated bleed 42, and escape of air is controlled by a valve, indicated generally at 43.

The valve 43 comprises a valve cage 44 having a bore 45 therein, for slidable reception of an adjustable valve seat 46. The seat 46 has a central passage 47 therein, and branch passages 48 terminating outwardly of a screw 49 formed integrally with the seat 46. The screw extends axially of said seat and is threadably received in an opening in an end wall 50 of the cage 44. Rotation of the screw 49 effects adjustment of the seat 46, and a lock nut 51 on said screw locks it in adjusted positions. A seal 52 is received in an internal groove provided therefor in the cage 44, and prevents leakage of air past the adjustable valve seat.

The axial bore in the valve seat has an enlarged portion 55 at the inner end which serves as a guide for a valve member comprising a stem 56, a conical seat engaging portion 57 and an enlarged portion 58 adjacent the portion 57, said portion 58 being profiled to provide passages 59 so that air may flow from the chamber 38 past the valve and into the upper end of the bore 45, as shown in the drawing, from whence the air may pass to a region of low pressure such as atmosphere, through a tube 60, threadably secured in a threaded opening 61 provided therefor in the wall of the cage 44.

The lower or inner end of the valve stem 56 is urged into abutment with a reenforcing plate 62 on the side of the diaphragm exposed to the pressure in the chamber 38 by means of a light spring 63 which reacts between the inner end of the adjustable seat member 46 and an enlarged head 64 at the lower end of the valve stem 56.

Opposite the reenforcing plate 62 is a reenforcing plate 65, a central region of the diaphragm 39 being clamped between said plates 62 and 65 which are secured together by a rivet 66 or any other suitable well-known means.

The chamber 38 is connected with the chamber 27 of the valve 14 by means of a conduit 67. Thus, the pressure in the chamber 27 will be substantially the same as the pressure in the chamber 38, said pressure being termed the control point setting pressure and the chamber 38 being termed the control chamber.

The chamber 37 is termed herein the back-up chamber for purposes of convenient reference.

The back-up chamber 37 houses an evacuated isobaric bellows 70 having a boss 71 at one end, terminating in a screw portion 72 received in an opening provided therefor in the top wall of the housing 36. The screw portion 72 is provided with a nut 73, whereby the bellows 70 is fixedly anchored to said wall adjacent the chamber 38.

The bellows 70 is operatively connected with the pilot valve mechanism by a lever 75 and a link spring 76. More specifically, the lever 75 has a fixed pivot 77 intermediate the ends thereof. The spring 76 is shown as being generally diamond-shaped and is connected to the lever, adjacent one end thereof, by a rivet 78 or by any other suitable means, said spring being connected to the diaphragm 39 by means of the rivet 66. The free end of the bellows 70 is provided with a stem 79 having a pivotal connection 80 with the lever adjacent the end thereof opposite the spring.

The end of the lever 75 adjacent the bellows is provided with a longitudinally extending screw 81 having an adjustable nut 82 thereon, said nut having an annular intermediate portion rotatable within a sleeve 83 which has an ear 84 to which one end of a spring 85 is attached. The opposite end of the spring 85 is connected to a yoke 86 carried by a nut 87 received on an adjusting screw 88, the outer end of said screw extending outwardly of the housing 36 and having an adjusting knob 89. The purpose of the adjusting nut 82 is to change the position whereat the effective pressure of the spring 85 is exerted on the lever 75 so as to compensate for production tolerances. Movement of the lever 75 is limited in both directions by fixed stops 90 and 91 which are adapted to be engaged by the screw 81, as will be more particularly described hereinafter.

A rate selector valve, indicated at 94, has an orifice including a passage 95, in a plug 96, and lateral passages 97 and 98 connecting said passage 95 with the chambers 38 and 37 respectively. The passage 95 is enlarged at 99, the enlarged part 99 of said passage extending within a valve fixture 100 and said passage 99 is internally threaded for reception of the externally threaded portion 101 of an adjusting rod 102. The threaded end of the rod 102 is provided with a reduced diameter tip 103 slidably received in the bore 95 and adapted to adjustably restrict the cross passage 98, thereby adjustably restricting the fluid connection between the chamber 37 and the chamber 38. The outer end of the rod 102 extends outwardly of the housing 36 and is provided with an adjusting knob 104.

*Operation of the mechanism*

Assuming that the aircraft is on the ground, the ground condition of the mechanism is as follows: Ambient atmospheric pressure exists in the chamber 38 and in chamber 37 since it is connected to chamber 38 through the passages 98, 95 and 97. Due to the pressure in chamber 37 the evacuated bellows 70 is completely collapsed, and as a result the screw 81, which may be considered as an end portion of the lever 75, is urged against the stop 90, and when the lever is in this position the pilot valve member or pin operably connected with the diaphragm 39, is in a wide open position. At this time the chamber 38 is freely connected with ambient atmosphere through the pilot valve and conduit 60, so that ambient atmospheric pressure exists in said chamber 38 and also in the chamber 27 of the outflow valve unit 14.

In preparation for a flight from a lower altitude airport to a higher altitude airport the pressure altitude selector knob 89 is adjusted to the pressure altitude of the terminal airport, or to the pressure altitude which it is desired to maintain isobarically in the cabin. The desired rate of change of pressure altitude may also be set at this time by adjusting the rate selector knob 104 to fix the size of the orifice of the valve 94, said adjustment of the rate selector knob positioning the pin or tip 103. Under these conditions no change occurs until the airplane starts to gain altitude. When the airplane takes off from the landing field and altitude is gained, a drop occurs in the ambient atmospheric pressure which is transmitted to the control chamber 38 through the open needle valve 58. Should the set rate be exceeded the pressure in the chamber 38 will drop below the pressure existing in the chamber 37, and a pressure differential will be set up across the orifice of the valve 94 as well as across the diaphragm 39. This will cause the diaphragm to move in a direction against the tension of the spring 76 to move the valve 43 in the closing direction.

There will then be an interaction between the forces acting on the diaphragm 39 and the action of the spring 76 which will result in positioning the metering pin 57 so as to maintain a substantially constant differential pressure across the orifice of the valve 94.

Except for sudden surges there is very little movement of the parts but there is a continual application of forces between them. The differential pressure between the chamber 38 and the chamber 37 will usually remain at a substantially constant value, for example, about .5" H₂O.

It will be understood that by thus continuing to maintain a substantially constant differential pressure across the orifice of the valve 94, the rate of change in pressure in the back-up chamber 37 is determined, and consequently, the rate of change in pressure in the control chamber and the pressure in the pressure chamber 27 behind the sensing valve 15 of the cabin outflow valve unit 14, is also determined. By gradually changing the pressure in the pressure chamber 27 by means of the control point setting mechanism, the cabin pressure will be changed from one pressure altitude to another. The rate at which the cabin pressure will change frome one value to another is determined by the setting of the valve 94.

As the pressure in the chamber 37 falls, it will reach a value where it is no longer high enough to exert sufficient pressure on the evacuated bellows 70 to maintain the bellows in the collapsed position against the tension which has been set into the isobaric spring 85.

The bellows will, therefore, expand under the influence of the spring 85 causing the end of the arm 75 to move to a position intermediate of the stops 90 and 91. This will relax the tension of the spring 76. At this time the pressures in the chambers 38 and 37 are substantially equal. However, a differential in pressure across the diaphragm 39 is no longer required to operate the valve 43 which is, at this time, moved toward the closed or metering position by the action of the bellows 70. Since the pressure in the chamber 38 follows that in the chamber 37, the control point setting remains constant and cabin pressure will, therefore, be maintained essentially constant. The cabin pressure is maintained at the desired value, for example, at about 2.5" H₂O higher than the pressure in the control chamber 38 as determined by the pressure or force exerted on the valve member 15 by the spring 30.

Under the conditions of isobaric control an equilibrium condition exists wherein there is no differential of pressure between the pressures prevailing in the chambers 38 and 37 due to the balanced action of the isobaric bellows 70 and the isobaric spring 85 acting through the lever 75 and the valve spring 76 to re-position the valve 57 in response to any change in the pressure in the chamber 38.

When a flight is to be made from a higher to a lower altitude airport, the altitude selector knob 89 is adjusted for the terminal airport pressure and is moved in a direction to increase the force of the spring 85 on the isobaric bellows 70, said bellows being expanded to a point whereat the screw 81 engages the stop 91, thereby limiting further expansion of said bellows. The action of the device is then the reverse from that described in connection with a flight from a low altitude airport to a higher altitude airport. If necessary, the valve 94 is also adjusted by means of the knob 104 to provide the required rate of pressure change.

It will be understood, of course, that the term "aircraft" as used herein, refers to any device adapted to pass through the earth's atmosphere.

I claim:

1. In a pressure control mechanism: walls defining a control pressure chamber having an inlet passage and an outlet passage; means for controlling the pressure in said control chamber comprising a differential pressure sensitive element subjected on one side to pressure in said control chamber and adapted to control one of said passages; a connection between the other side of said element and the control chamber, said connection including a relatively large capacity portion interposed therein; means forming a restriction between said large capacity portion of the connection and the control chamber; and an absolute pressure responsive device subjected to the same pressure as said other side of said element and adapted to cooperate with said differential pressure responsive element in controlling said one passage.

2. Mechanism for controlling the pressure in an enclosure, comprising: pressure control means operable to control the pressure in said enclosure, said pressure control means including a movable pressure sensitive element; walls defining a control pressure chamber, said movable pressure sensitive control element being exposed on one side to control chamber pressure and on the other side to enclosure pressure; and means for regulating said control chamber pressure, including pressure responsive means exposed on one side to pressure in the control chamber and on the other side to a region of control pressure having a restricted connection with the control chamber and operable independently of atmospheric pressure for gradually varying said control chamber pressure over a predetermined period of time, and pressure sensitive means subjected to the pressure of said region and cooperable with said pressure sensitive means in the control of the pressure in said control chamber.

3. Mechanism for controlling the pressure in an enclosure, comprising: pressure control means operable to control the pressure in said enclosure, said pressure control means including a movable pressure sensitive element; walls defining a control pressure chamber, said movable pressure sensitive control element being exposed on one side to control chamber pressure and on the other side to enclosure pressure; means for regulating said control pressure, including a pressure responsive device having a movable wall operable at a controlled rate of response and responsive to variations in the differential of pressure between that in the control chamber and a region of control pressure, said region having a connection with the control chamber, for gradually varying said control chamber pressure over a predetermined period of time; and means subjected to pressure of said region for arresting control chamber pressure at a predetermined value.

4. In pressure control mechanism: means defining a pair of pressure chambers having a restricted connection therebetween; and means for controlling the pressure in one of said chambers comprising pilot valve means including a pressure responsive element responsive to variations in the differential of pressure between said chambers for controlling the flow of fluid relative to said one chamber, and pressure responsive means having one side exposed to pressure in the other of said chambers for controlling the pressure in said one chamber.

5. In pressure control mechanism: means defining a pair of pressure chambers having a restricted connection therebetween, one of said chambers being of larger capacity than the other of said chambers; and means for controlling the pressure in the smaller of said chambers comprising pilot valve means including a pilot valve and a pressure responsive element controlling same, said pressure responsive element being responsive to variations in the differential of pressure between said chambers, and pressure responsive means responsive to the absolute pressure in the larger chamber and adapted to cooperate in the control of said pilot valve.

6. In pressure control mechanism: means defining a pair of pressure chambers having a restricted connection therebetween, one of said chambers being of larger capacity than the other; and means for controlling the pressure in one of said chambers comprising pilot valve means including a pilot valve member adapted to control the flow of fluid relative to the smaller chamber, a pressure responsive element responsive to variations in the differential of pressure between said chambers and adapted to actuate said pilot valve member, and absolute pressure responsive means exposed to the pressure in the larger chamber and adapted to cooperate in the control of the pilot valve member.

7. The invention defined by claim 6, wherein the pressure responsive element and the pressure responsive means are arranged in series.

8. In pressure control mechanism: means defining a pair of pressure chambers having a restricted connection therebetween; and means for controlling the pressure in one of said chambers, comprising pilot valve means including a pilot valve having an adjustable seat part and a movable valve member cooperating therewith for controlling the flow of fluid relative to said one chamber, a pressure responsive element responsive to variations in the differential of pressure between said chambers and pressure responsive means having one side exposed to pressure in the other of said chambers, said pressure responsive element and pressure responsive means cooperating to control said pilot valve.

9. The invention defined by claim 8, wherein the pressure responsive element and pressure responsive means are connected together with yielding resilient means.

10. The invention defined by claim 8, wherein a link spring is interposed between the pressure responsive element and the pressure responsive means for connecting the same together.

11. In pressure control mechanism: means defining a pair of pressure chambers having a restricted connection therebetween; and means for controlling the pressure in one of said chambers, comprising pilot valve means including a pressure responsive element responsive to variations in the differential of pressure between said chambers for controlling the flow of fluid relative to said one chamber; absolute pressure responsive means responsive to the pressure in the other of said chambers for controlling the pressure in said one chamber; means limiting the movement of said absolute pressure responsive means in both directions but permitting limited movement thereof, and means for adjusting the response of said pressure responsive means.

12. In pressure control mechanism: wall means defining a control pressure chamber; means for controlling the pressure in said chamber comprising a valve member for controlling the flow of fluid relative to said chamber; a pressure responsive element for controlling said valve member, said pressure responsive element being exposed on one side to pressure in said control chamber and being exposed on the other side to a region of variable controlled pressure urging the pressure responsive element in a direction to effect closing movement of said valve member; and an absolute pressure responsive device exposed to the pressure in said region and operably connected with said pressure responsive element for cooperative action in the control of said valve member.

13. The invention defined by claim 12, wherein expansion of said absolute pressure responsive device urges the valve member in the closing direction.

14. The invention defined by claim 12, wherein there is a slave valve unit having a pressure chamber connected with the control pressure chamber.

15. Pressure control mechanism, comprising:

wall means defining a control pressure chamber and a back-up chamber of substantially larger capacity than the control pressure chamber; a valve, including a movable valve member, for controlling the flow of fluid relative to the control chamber; passage means connecting said chambers; adjustable means for variably restricting said passage means; a differential pressure responsive element for controlling said valve member and responsive to variations in the differential of pressure between that in the control chamber and the back-up chamber; an absolute pressure responsive device responsive to the absolute pressure in the back-up chamber; a lever pivoted intermediate its ends and having one end operably connected to the pressure responsive device; a link spring connected to the other end of the lever and connected to the differential pressure responsive element; a pair of stop members spaced apart relative to the path of movement of said lever for limiting the movement of said lever in both directions; means for loading the pressure responsive device; and adjustable means for varying said loading.

16. In pressure control mechanism: walls defining a control pressure chamber having an inlet passage and an outlet passage; means for controlling the pressure in said control chamber including a valve controlling one of said passages and a differential pressure sensitive element subjected on one side to pressure in said control chamber and adapted to control said valve; a connection between the other side of said element and the control chamber, said connection including a relatively large capacity portion interposed therein; means forming a restriction between said large capacity portion of the connection and the control chamber; and an absolute pressure responsive device subjected to the same pressure as said other side of said element and adapted to cooperate with said differential pressure responsive element in controlling said one passage.

17. In a pressure control mechanism: walls defining a control pressure chamber having an inlet passage and an outlet passage; means for controlling the pressure in said control pressure chamber comprising a differential pressure responsive device subjected on one side to pressure in said control chamber and adapted to control one of said passages; a connection between the other side of said device and the control chamber including a relatively large capacity portion and a restriction between said portion and said chamber; and an absolute pressure responsive device subjected to pressure in said connection and adapted to cooperate with the differential pressure responsive device in controlling said one passage.

18. In a pressure control mechanism: means defining a pair of pressure chambers having a connection therebetween; and means for controlling the pressure in one of said chambers comprising pilot valve means including a pressure responsive element responsive to variations in the differential of pressure between said chambers for controlling the flow of fluid relative to said one chamber, and pressure responsive means having one side exposed to pressure in the other of said chambers for controlling the pressure in said one chamber.

19. In pressure control mechanism: means defining a pair of pressure chambers having a restricted connection therebetween; and means for controlling the pressure in one of said chambers comprising pilot valve means including a pressure responsive element responsive to variations in the differential of pressure between said chambers for controlling the flow of fluid relative to said one chamber, and pressure responsive means mechanically connected with said pressure responsive element and having one side exposed to pressure in the other of said chambers for controlling the pressure in said one chamber.

20. In pressure control mechanism: means defining a pair of pressure chambers having a restricted connection therebetween; means for controlling the pressure in one of said chambers comprising pilot valve means including a valve for controlling the flow of fluid relative to one of said chambers; a pressure responsive element responsive to variations in the differential of pressure between said chambers for controlling said valve; and pressure responsive means having one side exposed to pressure in the other of said chambers and cooperable with the pressure responsive element in the control of said valve.

21. In pressure control mechanism: a first chamber; a second chamber; movable wall means subject on opposite sides to the pressures in said chambers, means for controlling the pressure in said first chamber, said means being operated by said movable wall means; pressure responsive means in said second chamber; means connecting said pressure responsive means to said movable wall means; and means connecting said chambers together.

22. In pressure control mechanism: a first chamber; a second chamber; movable wall means subject on opposite sides to the pressures in said chambers, means for controlling the pressure in said first chamber, said means being operated by said movable wall means; absolute pressure responsive means in said second chamber; means connecting said pressure responsive means to said movable wall means; and means connecting said chambers together.

23. In pressure control mechanism: means defining a pair of pressure chambers having a restricted connection therebetween; and means for controlling the pressure in one of said chambers, comprising pilot valve means including a pressure responsive element responsive to variations in the differential of pressure between said chambers for controlling the flow of fluid relative to said one chamber, pressure responsive means having one side exposed to pressure in one of said chambers, and means connecting said pressure responsive means and pressure responsive element in series with respect to each other.

24. In pressure control mechanism: means defining a pair of pressure chambers; means forming a connection between said chambers; means for adjustably restricting said connection; and means for controlling the pressure in one of said chambers, comprising pilot valve means including a pressure responsive element responsive to variations in the differential of pressure between said chambers for controlling the flow of fluid relative to said one chamber, pressure responsive means having one side exposed to pressure in one of said chambers for controlling the pressure in said one chamber, and means connecting said pressure responsive means and pressure responsive element in series.

25. In pressure control mechanism: means defining a pair of pressure chambers having a restricted connection therebetween; and means for controlling the pressure in one of said chambers, comprising pilot valve means including a pressure responsive element responsive to variations in the differential of pressure between said chambers for controlling the flow of fluid relative to said one chamber, pressure responsive means having one side exposed to pressure in one of said chambers; and resilient means connecting said pressure responsive means and pressure responsive element in series with respect to each other.

26. In pressure control mechanism: a first chamber; a second chamber; movable wall means subjected on opposite sides to the pressures in said chambers; means for controlling the pressure in said first chamber; pressure responsive means having one side subjected to pressure in one of said chambers; resilient means connecting said pressure responsive means and said movable wall means for cooperative control of the means for controlling the pressure in said first chamber; and means connecting said chambers together.

RICHARD A. FISCHER.

References Cited in the file of this patent

UNITED STATES PATENTS

| Number | Name | Date |
|---|---|---|
| 2,463,487 | Widgery et al. | Mar. 1, 1949 |
| 2,513,332 | Kemper | July 4, 1950 |
| 2,531,100 | Arthur et al. | Nov. 21, 1950 |